(12) United States Patent
Skeie et al.

(10) Patent No.: US 7,756,497 B2
(45) Date of Patent: Jul. 13, 2010

(54) METHOD AND APPARATUS FOR SWITCHING BETWEEN SUBCHANNELS ON A SINGLE RADIO FREQUENCY BROADCAST

(75) Inventors: Richard A Skeie, Incline Village, NV (US); Bruce A Young, Le Mars, IA (US)

(73) Assignee: Radiosophy, LLC, Dakota Dunes, SD (US)

( * ) Notice: Subject to any disclaimer, the term of this patent is extended or adjusted under 35 U.S.C. 154(b) by 1074 days.

(21) Appl. No.: 11/278,035

(22) Filed: Mar. 30, 2006

(65) Prior Publication Data

US 2007/0234394 A1   Oct. 4, 2007

(51) Int. Cl.
*H04B 1/18* (2006.01)
(52) U.S. Cl. .................. 455/185.1; 455/3.02; 455/3.03; 455/130; 455/150.1; 455/151.1; 725/120; 725/118; 725/27; 725/37; 725/38; 348/555; 348/556; 348/731; 348/732
(58) Field of Classification Search .............. 455/185.1, 455/3.02, 3.03, 130, 150.1, 151.1; 725/120, 725/118, 27, 37, 38; 348/555, 556, 731, 348/732
See application file for complete search history.

(56) References Cited

U.S. PATENT DOCUMENTS

| 5,959,660 | A | * | 9/1999 | Levan | 725/131 |
| 6,084,645 | A | * | 7/2000 | Park et al. | 348/734 |
| 6,104,436 | A | * | 8/2000 | Lee | 348/563 |
| 6,888,581 | B2 | * | 5/2005 | Yamamoto et al. | 348/731 |
| 7,017,177 | B1 | * | 3/2006 | Funakoshi | 725/118 |
| 7,050,117 | B2 | * | 5/2006 | Takagi et al. | 348/725 |
| 2002/0104103 | A1 | * | 8/2002 | Takagi et al. | 725/151 |

\* cited by examiner

*Primary Examiner*—Sanh D Phu
(74) *Attorney, Agent, or Firm*—Bruce Young

(57) ABSTRACT

The present invention utilizes station preset buttons on a radio frequency receiver to allow the user to browse through the various subchannels included in a single station or channel. The preset buttons still have the standard function of having a frequency and subchannel selection parameter associated with the button that can be used to directly select that subchannel. But subsequent presses of the button may change the currently playing program to a different program contained in the same station or channel using a circular queue ordering.

20 Claims, 5 Drawing Sheets

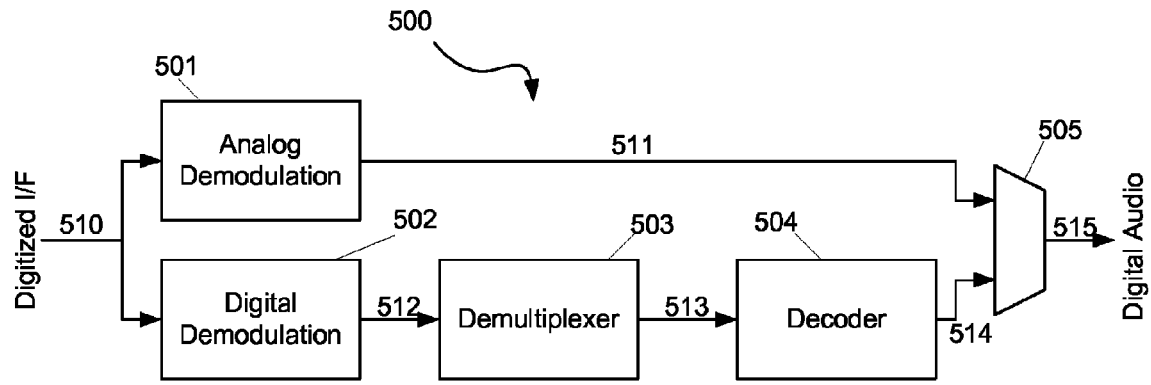
FIG. 5
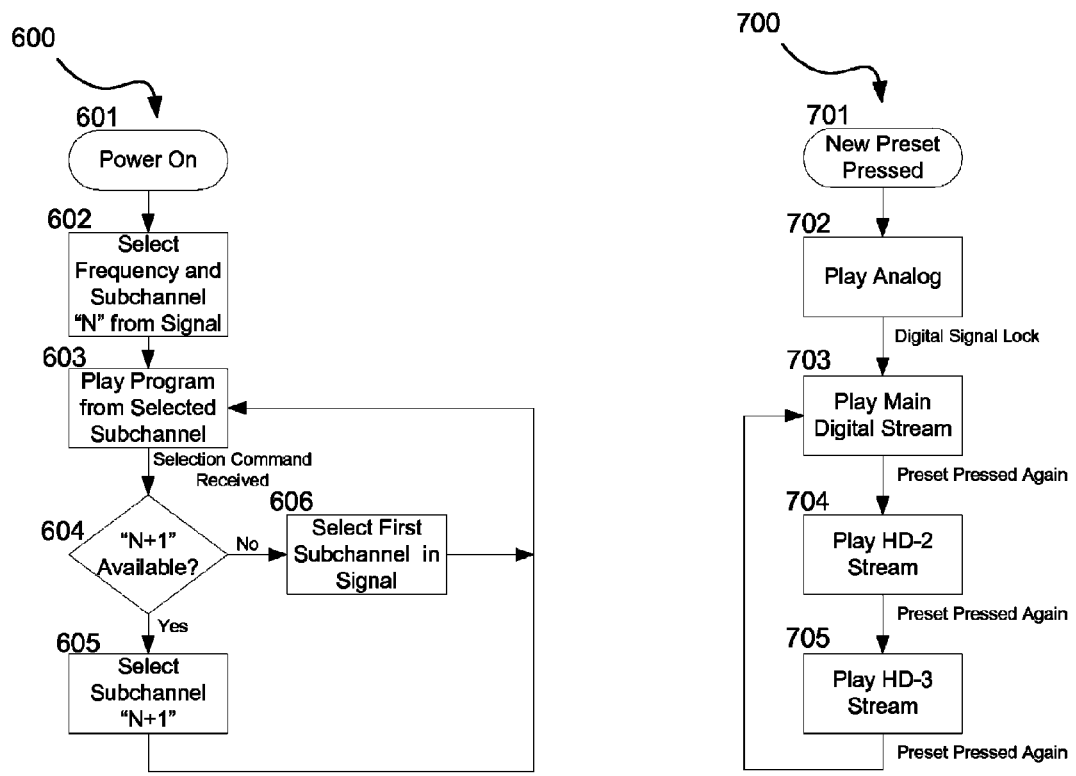
FIG. 6
FIG. 7

METHOD AND APPARATUS FOR SWITCHING BETWEEN SUBCHANNELS ON A SINGLE RADIO FREQUENCY BROADCAST

FIELD OF THE INVENTION

The present invention relates generally to radio and television receiver technology. More specifically, it relates to a method of selecting the desired program stream from a plurality of streams available on a single station or channel.

BACKGROUND OF THE INVENTION

In the past, radio frequency broadcasts of audio or audio-video programming have used analog technology with a single program per carrier frequency (often referred to as a station or a channel). While there has been some limited capability to offer alternative programming on a single channel such as Secondary Audio Programming (SAP) included in the television broadcast standard in the United States, the advent of digital technology provided the capability to offer multiple, simultaneous programs on a single station. Digital broadcast standards such as those from the Advanced Television Systems Committee (ATSC) for television and the in-band on-channel (IBOC) system developed by iBiquity Digital Corporation for AM and FM radio allow several completely independent, simultaneous programs to be combined into a single broadcast signal and sent out in one channel's frequency allocation.

Users have grown accustomed to the model where there is a one-to-one correspondence between the programming and the carrier frequency. For radio broadcasts, they are required to tune to the actual carrier frequency to hear the station; tuning to 90.3 MHz actually sets the tuner to demodulate the carrier at 90.3 MHz. For television, a channel model is used where an arbitrary number from 2-69 is used to represent a carrier frequency ranging from 55.25 MHz to 801.25 MHz. Once a digital carrier with multiple simultaneous programs is broadcast, as allowed by the ATSC and IBOC standards, the tuning model must be enhanced. While a station frequency or channel number is still required, another parameter to select the desired program, or subchannel, from the plurality of programs included in the signal is also required. In many TV and radio receivers today, this additional subchannel parameter can be directly entered as a suffix to the frequency or channel. Most receivers also insert the added subchannels as virtual channels between the analog channels. For example, if the user hits the "Tune Up" button while listening to a radio station at 90.3 with three subchannels called main program, HD-2 and HD-3, many IBOC compatible radio receivers will tune from the main program at 90.3 to 90.3 HD-2 and then to 90.3 HD-3 before tuning to 90.5. While this provides a way for the user to access the added programming, it does not clearly group all the subchannels of a single station together.

Another common method of tuning a radio is to use preset buttons. Preset buttons allow the user to configure a particular button to always go to a station determined by the user. This mechanism works in the old analog model and has been extended into the digital domain by adding the additional parameter for the subchannel selection to the frequency information that is associated with the button. This invention provides a method of selecting the programming within a single station that can be used in conjunction with these other tuning methods.

SUMMARY OF THE INVENTION

The present invention utilizes station preset buttons on a radio frequency receiver to allow the user to browse through the various subchannels included in a single station or channel. The preset buttons still have the standard function of having a frequency and subchannel selection parameter associated with the button that can be used to directly select that subchannel. But subsequent presses of the button may change the currently playing program to a different program contained in the same station or channel using a circular queue ordering.

To illustrate the invention, assume a FM radio station is broadcasting at 90.3 MHz with three subchannels referred to as the main program, HD-2 and HD-3 and the user has set a preset button to directly tune to 90.3 MHz HD-2. If the user presses that button while listening to a different station, the radio will switch directly to 90.3 MHz and play the HD-2 programming. If the user presses the preset again on a radio utilizing the present invention, the radio will change from HD-2 to HD-3 on 90.3 MHz. The next press will change to the main program and another press will take the user back to HD-2.

BRIEF DESCRIPTION OF THE DRAWINGS

FIG. 5 is a block diagram of the functions implemented in the firmware running on the Digital Signal Processor in the preferred embodiment of a radio receiver utilizing the present invention.

FIG. 6 is a flow-chart diagram of the present invention.

FIG. 7 is a flow-chart diagram example of the subchannels selected by a radio receiver utilizing the present invention when tuned to a specific exemplary radio station and a specific sequence of buttons are pressed.

DETAILED DESCRIPTION OF THE INVENTION

Reference will now be made to the accompanying drawings to further describe the preferred embodiment of the present invention. While the invention will be described in light of the preferred embodiment, it will be understood that it is not intended to limit the invention to those embodiments. The invention is intended to cover all modifications, alternatives or equivalents which may included within the spirit or scope of the invention as defined by the appended claims.

The following detailed descriptions give many specific details in order to provide a thorough understanding of the present invention. It will be recognized by one of ordinary skill in the art that the present invention may be practiced without those specific details. In other cases, well known methods, processes and techniques have not been described in detail so as not to obscure aspects of the present invention.

Figure 1:
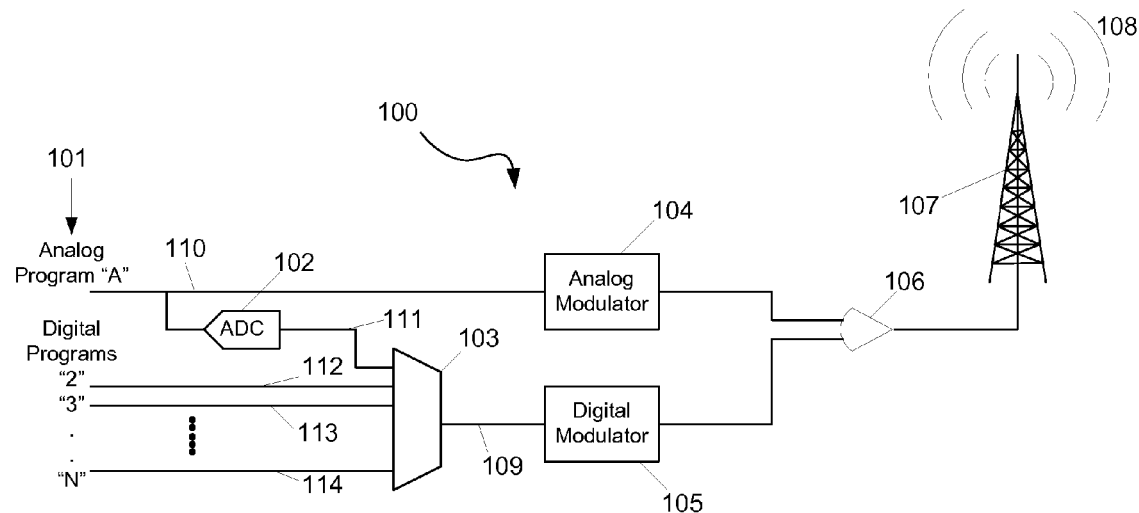
FIG. 1 is a block diagram of an exemplary radio broadcast station suitable for generating a signal to be used by the present invention

Referring now to FIG. 1, a radio broadcast station 100 is broadcasting a radio signal 108 comprised of several programs 101. These programs 101 can consist of news, sports coverage, talk, music or any other type of audio information. An alternative embodiment could be created for TV broadcasting but in this particular embodiment which is consistent with the FCC approved in-band on-channel (IBOC) system developed by iBiquity Digital Corporation, there is a single analog audio program "A" 110 that is modulated onto a carrier signal by the analog modulator 104, amplified to a high power signal by the transmitter 106 and broadcast through the antenna 107. In this exemplary embodiment of a radio station 100, the analog modulator 104 uses frequency modulation (FM) on a 87.9 to 109.9 MHz carrier or amplitude modulation (AM) on a 540 to 1700 kHz carrier to generate a signal compatible with readily available AM/FM radio receivers in the United States.

In this embodiment, the analog program "A" 110 is converted to a main digital stream 111 by the analog to digital converter (ADC) 102. The main digital stream 111 contains the same audio program as analog program "A" 110 but in a digital form. The exemplary radio station 100 can also include additional programs 101 encoded as digital streams which are shown in FIG. 1 as digital stream "2" 112, digital stream "3" 113 and digital stream "N" 114. The total number of digital streams available on a radio broadcast station 100 may be limited by the particular implementation. The IBOC system allows for up to 8 total digital streams to be included on a single station. Further discussion will assume that a station includes three digital streams, the main digital stream 111, digital stream "2" 112 which is sometimes referred to as HD-2 and digital stream "3" 113 which is sometimes referred to as HD-3. Digital stream "N" 114 is shown to illustrate that more than three digital streams may be allowed. These digital streams 111-114 can be simple pulse-code modulated (PCM) data or, more commonly, they are compressed using a lossy compression algorithm such as the High Definition Codec (HDC) algorithm used in the IBOC system.

The entire set of digital streams 111-114 are then combined into a single digital stream 109 by the multiplexer 103. There are many variations of how the digital streams 111-114 can be combined to provide for error robustness and correction but in its simplest form, the multiplexer 103 takes time slices of each digital stream 111-114 and combines them into a single, higher-speed, digital stream 109 using time-domain multiplexing. The digital stream 109 is then modulated by the digital modulator 105. In this exemplary embodiment, this modulation is accomplished by using orthogonal frequency domain multiplexing (OFDM) which employs a large number of narrowband subcarriers located in the sidebands of the analog carrier frequency but other technology could be used. The output of the digital modulator 105 is then combined with the output of the analog modulator 104 and amplified by the transmitter 106. The combined signal is then transmitted as the IBOC radio signal 108 by the antenna 107.

Figure 2:
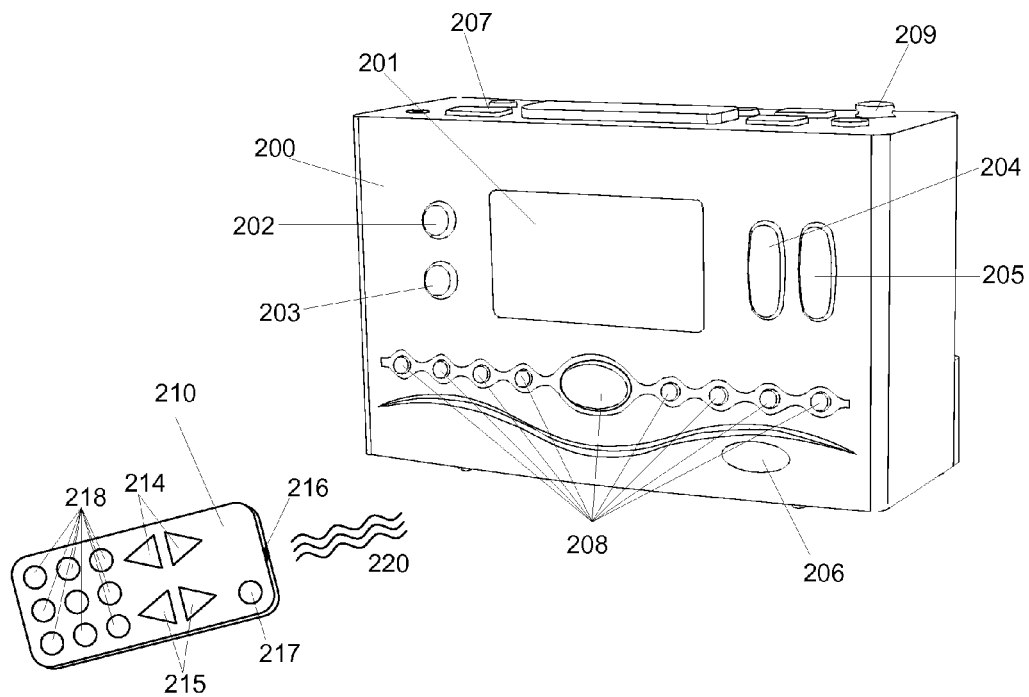
FIG. 2 is a representation of an exemplary radio receiver capable of utilizing the present invention.

While the analog audio program 110 can be recovered from the radio signal 108 by a standard AM/FM receiver simply by tuning the receiver to the proper frequency, additional functionality must be included in the receiver to be able to recover a digital stream. FIG. 2 provides a view of the MultiStream™ HD receiver from Radiosophy as an exemplary receiver 200 capable of an audio program recovered from a digital stream in the IBOC radio signal 108. It includes a power switch 207, an antenna 209 for receiving the radio signal 108, a display 201 for identifying the currently selected frequency and other textual information, a button 202 for selecting whether to tune the 540-1700 kHz AM band or the 87.9-107.9 FM band and a button 203 for selecting a menu function in the receiver. It also includes two methods for selecting which frequency to tune. Tuning switch 204 allows the user to step through the selected frequency band to all allowable frequency locations. It will step up or down through the band by 10 kHz steps if the AM band is selected and by 200 kHz steps if the FM band is selected. Scanning switch 205 tells the radio to tune to the next active frequency. This causes the radio to rapidly tune up or down the selected band to find the next frequency with strong enough signal to allow the radio 200 to tune to the signal 108. The tuning switch 204 and scanning switch 205 will also step sequentially through the available digital streams in the IBOC radio signal 108. The radio 200 also includes a set of preset buttons 208. These buttons allow the user to store a frequency and subchannel identifier to be associated with each button allowing the user to rapidly select the same frequency and subchannel in the future.

The radio receiver 200 may also include a remote control 210. This remote control 210 may include a power button 217, tuning buttons 214, scanning buttons 215 and preset buttons 218. It might include other buttons as well. When a button is pressed on the remote control, a specific code sent to the infrared (IR) transmitter 216 causing modulated IR radiation 220 to be emitted. The infrared window 206 on the radio receiver 200 allows the modulated IR radiation 220 to enter the case where it can be received and interpreted. The radio 200 then interprets the specific code to determine which button on the remote control 210 was pressed. It then performs the same action as if the corresponding button on the radio 200 was pressed.

Figure 3:
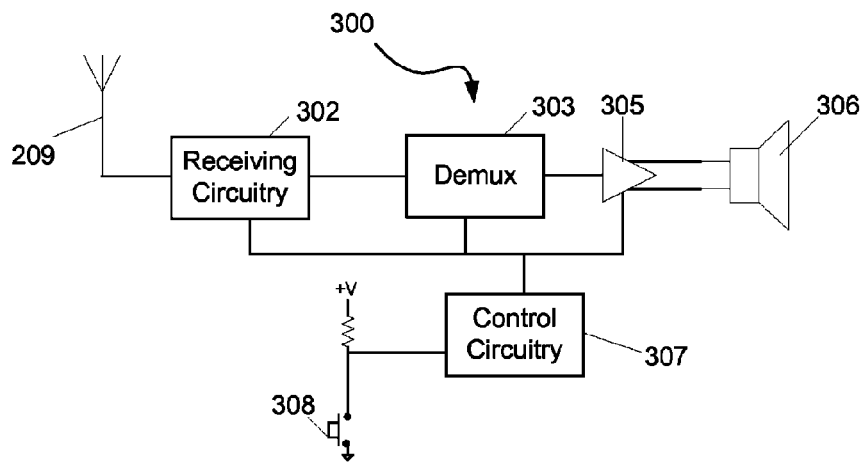
FIG. 3 is a block diagram of a radio receiver utilizing the present invention.

FIG. 3 shows a simplified, high-level block diagram 300 of the radio receiver 200. It includes the antenna 209 that feeds the radio signal 108 to the receiving circuitry 302. The receiving circuitry 302 tunes to the selected frequency, demodulates the signal and feeds it to the demultiplexer (demux) 303. The demux 303 selects desired digital stream from the signal based on the selected subchannel and passes it to the amplifier 305 which drives the speaker 306 to generate the audio program for the listener. Control Circuitry 307 can interpret user input from a preset switch 308, one of the preset buttons 208 shown in FIG. 2, and control the receiving circuitry 302, the demux 303 and amplifier 305 to allow the user to select the desired program.

Figure 4:
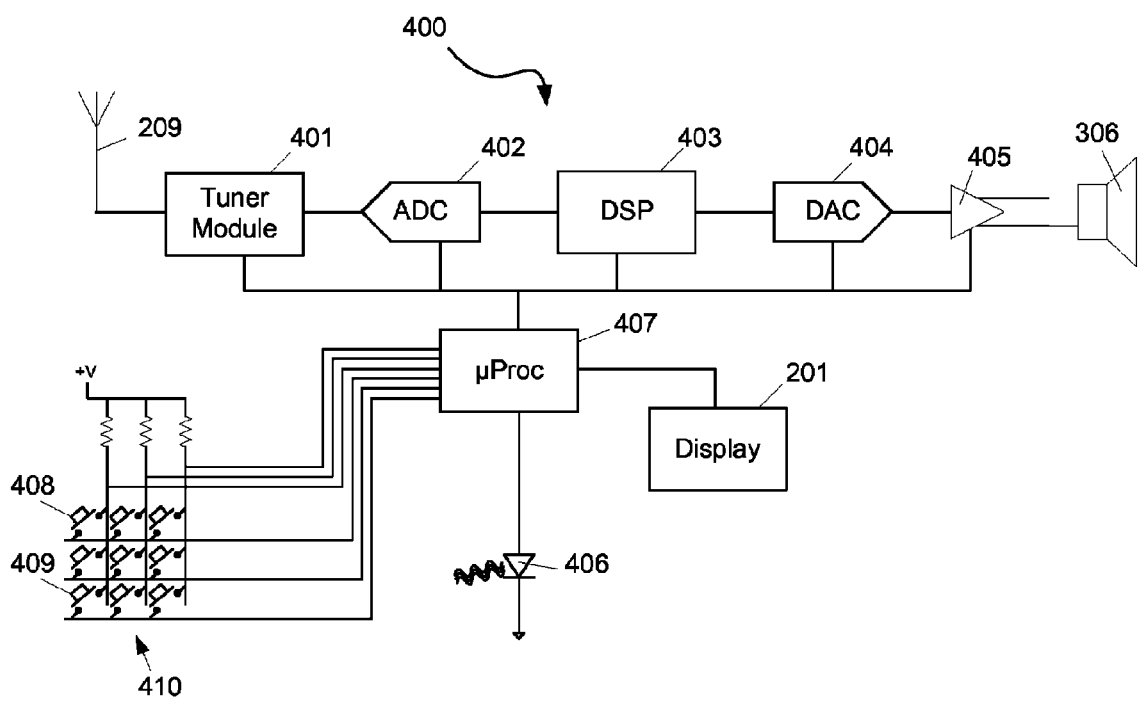
FIG. 4 is a more detailed block diagram of the preferred embodiment of a radio receiver utilizing the present invention.

A more detailed block diagram 400 of the preferred embodiment of the radio receiver 200 is shown in FIG. 4. All the elements of the simplified block diagram 300 are present in the detailed block diagram 400 although there is not necessarily a one-to-one correspondence for all the blocks. The receiving circuitry 302 is implemented by the tuner module 401, analog to digital converter (ADC) 402 and firmware running in the digital signal processing subsystem (DSP) 403. The tuner module 401 converts the selected carrier frequency to an intermediate frequency signal that is passed to the ADC 402 where it is digitized before being fed into the DSP 403. The demux 303 is implemented as one of several functions of the firmware in the DSP 403 and the amplifier 305 is comprised of the digital to analog converter (DAC) 404 and analog amplifier 405. Control circuitry 307 is implemented as firmware running in the microprocessor (μProc) 407 and the preset switch 308 is implemented as preset button 408 in a switch matrix 410. Block diagram 400 shows some additional detail including a display 201, an additional preset switch 409 in the switch matrix 410 and an IR receiver 406 that is positioned behind the IR window 206. Preset buttons 408 and 409 are each included in the set of preset buttons 208. Although the preferred embodiment of the radio 200 has nine preset buttons, other implementations could have any number of preset buttons defined without departing from the spirit of this invention.

In the preferred embodiment, the tuner module 401 is a TDGA2X010A from Alps Electric Ltd., the ADC 402 is an AFEDRI8201 from Texas Instruments, the DAC 404 is a PCM 1782 from Texas Instruments and the analog amplifier 405 is a TDA8567Q from Philips Semiconductors. The display 201 is a 128×64 dot LCD with backlight such as a BF-MG12864DLBS-19C-1 from Bona Fide Technology Ltd. and the IR receiver 406 is a MIM-5385K1F from Unity Opto Technology Company Ltd. The DSP 403 is implemented using a TMS320DR1350 Digital Baseband for HD Radio chip from Texas Instruments connected to a 32 Mbit Flash ROM used to store firmware instructions and a 64 Mbit SDRAM to be used for working memory. The μProc 407 is implemented using a PIC18F4550 integrated microcontroller from Microchip Technology Inc. that has 32 kbytes of non-volatile program memory and 2 kbytes of random access memory (RAM). The μProc 407 controls the tuner module 401, the ADC 402, the DSP 403, the DAC 404 and the analog amplifier 405 using combination of dedicated general purpose I/O lines and an I$^2$C bus. The μProc 407 runs software instructions, or firmware, that have been stored in the internal non-volatile program memory allowing it to scan the switch matrix 410 to determine whether preset button 408, preset button 409, or any other buttons on the radio 200 have been pressed. The firmware running in the μProc 407 can also interpret the output of the IR receiver 406 to determine if a button on the remote control 210 has been pressed. Each preset button in the set of preset buttons 208 has a location in the internal RAM of the μProc 407 to store an associated frequency and digital program. Whenever a preset button is pressed, the μProc 407 detects which button is pressed, retrieves the stored associated frequency and digital program and sends commands to the tuner module 401 and DSP 403. Another location in the internal RAM of the μProc 407 is used to store an indication of which preset button was last pressed.

A block diagram of the firmware 500 running on the DSP 403 is shown in FIG. 5. The digitized intermediate frequency data 510 is passed to the analog demodulator 501 firmware block and the digital demodulator 502 firmware block. These blocks perform digital signal processing algorithms on the incoming data 510 to determine if a valid analog and/or digital signal is available. This information is then made available to the μProc 407 which uses it as one of the variables to determine which program should be selected. If the analog program is to be selected, the analog modulator 501 is commanded to start fully demodulating the incoming data 510 to digital audio data 511 which is then passed to the output selector 505. In the preferred embodiment, the analog demodulator 501 firmware block has the ability to demodulate either an AM or FM signal at the command of the μProc 407. The μProc 407 also commands the output selector 505 to select the digital data 511 representing the analog audio program to be the digital audio output 515 to send to the DAC 404.

If a digital stream is to be selected, the μProc 407 commands the digital demodulator 502 to start fully demodulating the digital data 512 from the incoming digitized intermediate frequency data 510. In the preferred embodiment, the digital demodulator 502 firmware block implements an algorithm to extract the digital data 512 from an OFDM signal.

The extracted digital data 512 is then passed to the demultiplexer 503 firmware module. The demultiplexer 503 may perform error correction on the data. Then, based on the desired subchannel, the μProc 407 will command it to extract an individual digital stream 513 from the demodulated digital data 512. In the preferred embodiment, there is information embedded in the digital data 512 to tag each block of data as being associated with a particular individual digital stream. In an alternative embodiment, the individual digital streams are simply time domain multiplexed with a predetermined data block size so that a given data stream is made up of a block of "A" bits with "B" bits skipped before the next block of relevant data is found. The exact scheme required is determined by the method used at the broadcast location to multiplex the data and one skilled in the art could apply many different methods to accomplish the same task of extracting an individual digital stream 513 from the digital data 512.

If the selected individual digital stream 513 consists of compressed audio it will need to be decoded. The decoder 504 firmware block implements the appropriate algorithms to decompress the individual digital stream 513 into an uncompressed digital audio stream 514. In the preferred embodiment the decoder 504 implements a the High Definition Coded (HDC) as defined by the IBOC system but many different compression schemes could be used or, if the individual digital streams consist of uncompressed PCM audio data, the decoder 504 could pass the data through untouched. The output selector 505 is then commanded to select the uncompressed digital audio stream 514 as the digital audio 515 to send to the DAC 404.

Referring now to FIG. 6, a flow chart 600 showing the present invention is presented. In the preferred embodiment as shown in FIG. 4, the flow chart 600 is implemented in the firmware running on the μProc 407. Each step may require the μProc 407 to send commands to other devices such as the tuner module 401 and the DSP 403. The exact details of those commands are dependent on the exact implementation and should be well understood by one skilled in the art so they are left out of this description for clarity. When the radio 200 is first turned on at 601, it initializes itself and selects a frequency and subchannel "N" at 602 where "N" is a number from 1 to "M", where "M" represents the number of subchannels available on that frequency and is determined by the demultiplexer 503 and made available to the μProc 407. In the preferred embodiment, the radio selects the frequency and subchannel to be the same frequency and subchannel that was playing when the radio was turned off but other methods could be used. If the first digital program is the same as the analog program, the analog program may not be counted as one of the "M" programs for this algorithm. The radio begins to play the audio program contained in the selected subchannel at 603. The radio continues to play that program until a selection command is received. A selection command will typically be caused by a user pressing a button dedicated to this purpose on the radio 200, a preset button on the radio 200, or a button on the remote control 210 but it could also be a voice command, a command received through a network interface from another device, or any number of other events that could be defined for a particular implementation. When the selection command is received, the radio evaluates whether a subchannel "N+1" is available on the currently specified frequency at 604. If subchannel "N+1" is available, it is selected at 605. If there is no subchannel "N+1" because "N" is equal to "M", the first subchannel available on the currently specified frequency is selected at 606. This is called a circular queue ordering. Once the new subchannel has been selected at 605 or 606, the radio starts to play the program contained in the newly selected subchannel at 603 and waits for the next selection command.

To illustrate this the results of the flow chart 600, FIG. 7 shows a flow chart 700 of the behavior of a radio receiving a specific radio station's signal with an analog audio program and three digital subchannels. In this example, the three digital subchannels are a main digital stream that contains the same audio program as the analog audio, and two additional digital streams referred to as HD-2 and HD-3. This configuration is consistent with the IBOC broadcast environment shown in FIG. 1. In this particular implementation, the press of a preset button 408 on the radio 200 is interpreted as the selection command and after the radio has been powered on, the preset button is pressed at 701 causing the radio 200 to tune to the frequency associated with that preset and play the analog audio program on that frequency at 702. In the IBOC system, it can take some time to determine if there is a digital carrier present, interpret what subchannels are available, and to build up a buffer of data to allow a subchannel to be selected. This delay is can be called the digital signal lock. After the digital signal lock, the radio switches to the first subchannel containing the main digital stream at 703. Since the main digital stream containing the same audio as the analog audio program, this simply gives the user a better frequency response and higher signal to noise ratio than the analog program can provide without changing the content of the program being listened to by the user. The radio 200 will continue to play the main digital stream until the preset button is pressed again. When it is pressed, the radio 200 will switch to the subchannel 2 (HD-2) at 704. It will stay on HD-2 until the preset is pressed again when it will switch to subchannel 3 (HD-3) at 705. When the preset is pressed yet again, the µProc 407 will determine that there are no additional subchannels available on this frequency and it will go back to the first subchannel at 703. This behavior of switching between the different subchannels utilizing a circular queue order will continue until a different frequency is selected.

Figure 8:
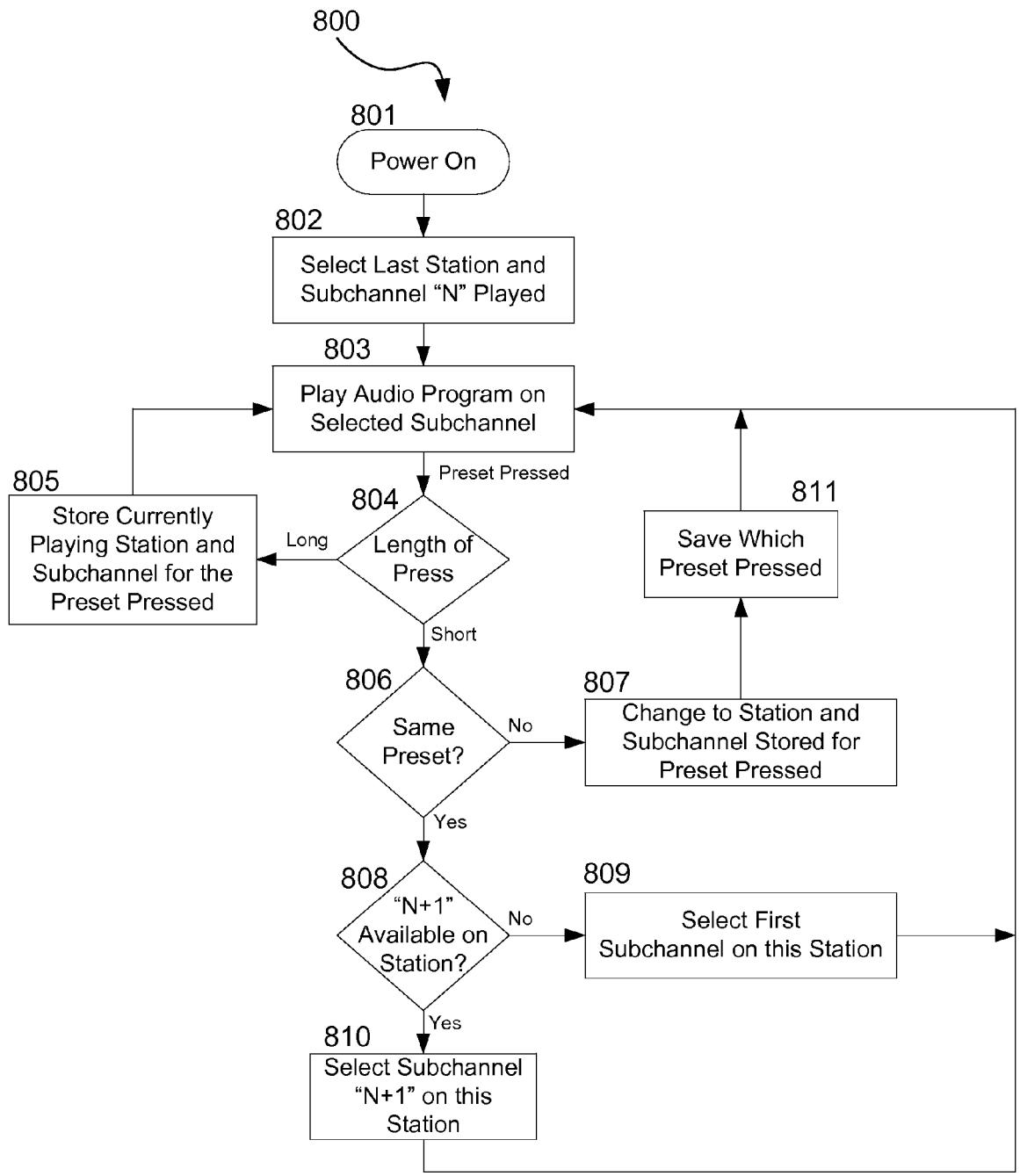
FIG. 8 is a flow chart diagram of the preferred embodiment of the present invention.

FIG. 8 is a flow chart 800 showing the preferred embodiment of the present invention. It is consistent with flow chart 600 while providing more specific detail of the implementation. The radio 200 is powered on at 801 and it selects the frequency of the last station played and picks the same subchannel "N" as was playing when the radio 200 was turned off at 802. It then starts playing the program contained in the selected subchannel at 803. If the last program played was the analog audio program or the main digital stream containing the same audio program as the analog, the radio will automatically switch to the main digital stream after the digital signal lock is completed. If the last audio program played was from another subchannel, the radio will be muted until the digital signal lock is completed and the radio can start playing the selected subchannel. The digital signal lock occurs within step 803. When the µProc 407 determines that a preset button is pressed, it evaluates how long the preset is held before being released at 804. If the preset is held for more than a predetermined length of time it is interpreted as a "store" command. In the preferred embodiment, the predetermined length of time is 2 seconds. If the press is interpreted as a "store" command, the currently playing station frequency and subchannel are stored in a memory location associated with the preset button pressed at 805. Other methods of storing the station frequency and subchannel to be associated with the preset button, such as using a separate "set" button in conjunction with the preset button, could be employed without departing from the scope of this invention. In the preferred embodiment, this memory location is non-volatile and will be retained through a power cycle. If the preset is depressed for less than a predetermined length of time, the µProc 407 then decides if it is a different preset button than was pressed last at 806. In the preferred embodiment, each potential button has a different code corresponding to the position within the switch matrix 410 where it resides. The µProc 407 has a memory location dedicated to hold the code of the last preset button pressed that can be compared to the code of the current button press. If the latest preset pressed is not the same preset button as was last pressed, the radio changes to the station and subchannel stored in the memory location associated with the pressed preset button at 807. The current button press code is then stored in the last preset button pressed memory location at 811 and the new audio program is played at 803.

If the current button press is the same as the last preset button pressed, the µProc 407 will determine the next subchannel to select from the current frequency using the circular queue order. This is done by determining if there is a subchannel higher in the queue order at 808 and if there is, selecting it at 810. If there is not, the first subchannel on this frequency is selected at 809. After the next subchannel in the circular queue is selected at 809 or 810, the selected audio program is played at 803.

Figure 9:
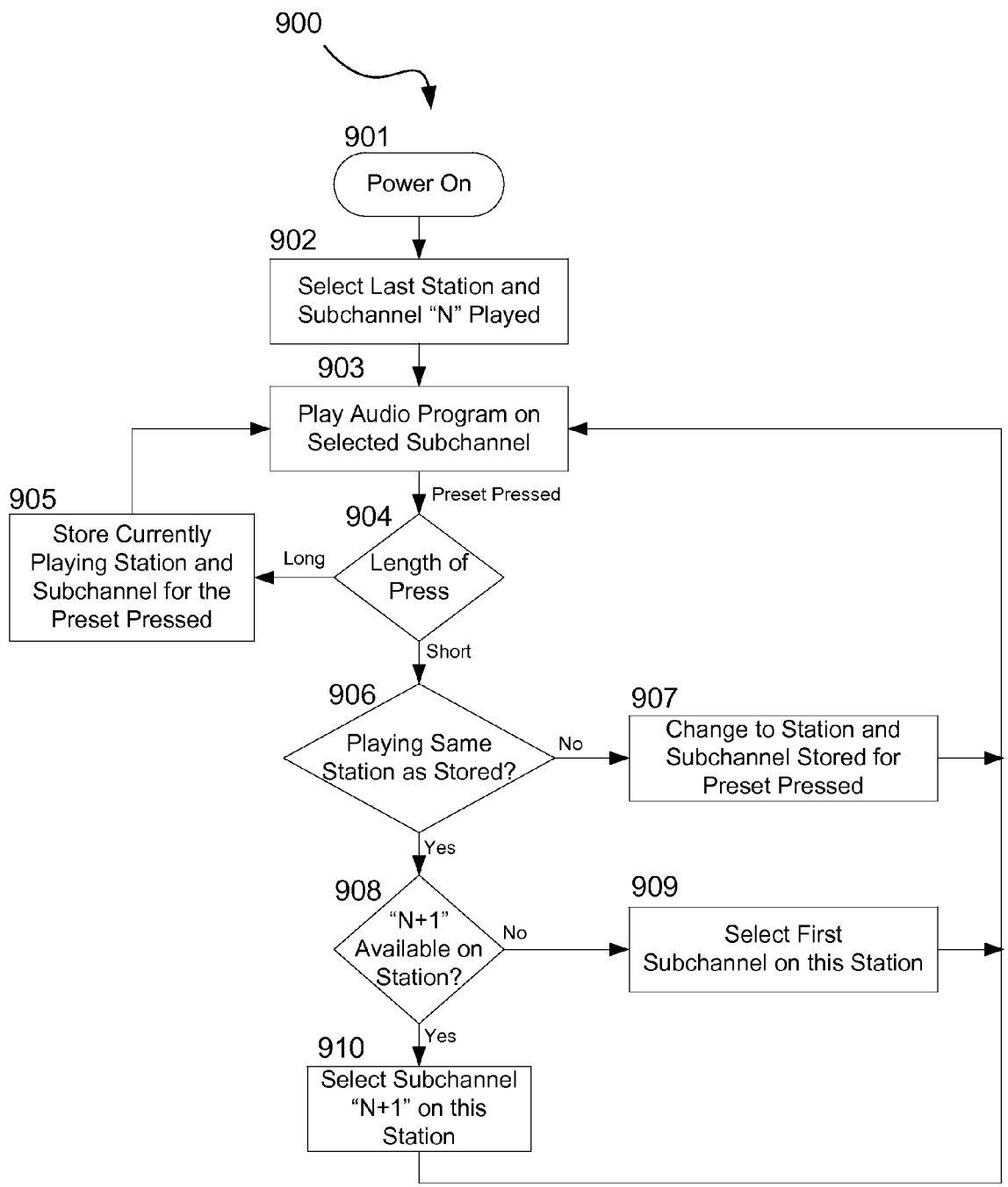
FIG. 9 is a flow chart diagram of an alternative embodiment of the present invention.

Flow chart 900 shown in FIG. 9 shows an alternative implementation of the present invention. The radio 200 is powered on at 901 and it selects the last station and subchannel played at 902 then starts to play the selected program at 903. When the µProc 407 determines that a preset button is pressed, it evaluates how long the preset is held before being released at 904. If the preset is held for more than a predetermined length of time it is interpreted as a "store" command and the currently playing station frequency and subchannel are stored in a memory location associated with the preset button pressed at 905. If the preset is held for less than the predetermined length of time the µProc 407 retrieves the station information stored with the preset and compares it to the currently playing station at 906. If they are different, the station and subchannel associated with the preset are selected at 907 then it is played at 903. If the stored station is the same as the playing station, the µProc 407 will determine the next subchannel to select from the current frequency using the circular queue order. This is done by determining if there is a subchannel higher in the queue order at 908 and if there is, selecting it at 910. If there is not, the first subchannel on this frequency is selected at 909. After the next subchannel in the circular queue is selected at 909 or 910, the selected audio program is played at 903.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A method for switching between a plurality of subchannels contained in an electrical signal comprising the steps of:
   tuning to the electrical signal and having a currently selected subchannel chosen from the plurality of subchannels contained in the electrical signal;
   determining a circular queue ordering of the plurality of subchannels contained in the electrical signal;
   determining a location of the currently selected subchannel within the circular queue ordering;
   receiving a selection command;
   retrieving an associated electrical signal identifier and an associated subchannel identifier indicated by the selection command;

comparing the selection command to a previous selection command;

selecting a different subchannel from a next location following the location of the currently selected subprogram within the circular queue ordering only if the selection command is the same as the previous selection command;

tuning to a new electrical signal indicated by the associated electrical signal identifier and selecting the different subchannel indicted by the associated subchannel identifier only if the selection command is different from the previous selection command; and changing from the currently selected subchannel to the different subchannel in response to the selection command.

2. The method according to claim 1, wherein the electrical signal is a radio frequency signal modulated with at least a stream of digital data comprising two or more subchannels.

3. The method according to claim 2, wherein the circular queue ordering only contains entries for digital subchannels contained in the electrical signal.

4. The method according to claim 1, wherein the electrical signal is a band of radio frequency signals up to 400 kHz wide modulated with a stream of digital data comprising two or more subchannels of audio data using Orthogonal Frequency Division Modulation.

5. The method according to claim 1, the electrical signal comprising:

an analog audio program that is modulated on a radio frequency carrier; and a stream of digital data comprising two or more subchannels of audio data modulated on the sidebands of the radio frequency carrier using Orthogonal Frequency Division Modulation.

6. The method according to claim 1, wherein the electrical signal is a radio frequency carrier modulated with a stream of digital data comprising two or more subchannels of audio-video data.

7. The method according to claim 6 wherein the radio frequency carrier is modulated using 8-level Vestigial Sideband Modulation.

8. The method according to claim 1, wherein the selection command is a button press.

9. The method according to claim 1, wherein the selection command is a specific code from a remote control.

10. A method for changing subchannels containing audio programs on a receiver using a set of one or more presets comprising the steps of:

tuning to a current radio frequency and having a currently selected subchannel selected from a plurality of subchannels modulated on the radio frequency signal;

determining a circular queue ordering of the plurality of subchannels modulated on the radio frequency;

determining a next subchannel within the circular queue ordering based on the currently selected subchannel;

storing a specific radio frequency identifier and subchannel identifier for a specific preset selected from the set of one or more presets;

receiving a command to change to the specific preset; and in response to the command to change to the specific preset, switching to either a radio frequency and subchannel as indicated by the specific radio frequency identifier and subchannel identifier stored for the specific preset or to the next subchannel within the circular queue ordering.

11. The method according to claim 10, wherein receiving the command to change to the specific preset comprises receiving a code from a remote control.

12. The method according to claim 10, wherein receiving the command to change to the specific preset comprises detecting a press of a button on the receiver.

13. The method according to claim 10, wherein the step of switching to either a radio frequency and subchannel as indicated by the specific radio frequency identifier and subchannel identifier stored for the specific preset or to the next subchannel within the circular queue ordering further comprises the steps of:

switching to the next program only if the specific radio frequency identifier stored for the specific preset is the same as the current radio frequency; and switching to the radio frequency and subchannel as indicated by the specific radio frequency identifier and subchannel identifier stored for the specific preset only if the specific radio frequency identifier stored for the specific preset is different than the current radio frequency.

14. The method according to claim 10, wherein the step of switching to either a radio frequency and subchannel as indicated by the specific radio frequency identifier and subchannel identifier stored for the specific preset or to the next subchannel within the circular queue ordering further comprises the steps of:

having a stored previous command to change to a preset;

switching to the next program only if the command to change to the specific preset is the same as the stored previous command; and switching to the radio frequency and subchannel as indicated by the specific radio frequency identifier and subchannel identifier stored for the specific preset only if the command to change to the specific preset is the different than the stored previous command.

15. A digital receiver apparatus comprising:

receiving circuitry capable of tuning to a selected radio frequency and recovering a digital bit stream from the selected radio frequency;

a demultiplexer capable of selecting a single subchannel from a plurality of subchannels in the digital bit stream;

a button;

a preset memory used for storing for a preset radio frequency identifier and subchannel identifier associated with the button;

control circuitry capable of detecting when the button has been pressed and commanding the demultiplexer to select a different single subchannel from the plurality of programs in the digital bit stream using a circular queue ordering; and the control circuitry having further capability of tuning to a different radio frequency indicated by the preset radio frequency identifier and subchannel identifier if the preset radio frequency identifier is different than the selected radio frequency.

16. The digital receiver apparatus according to claim 15, wherein at least one of the receiving circuitry, the demultiplexer and the control circuitry is implemented using firmware running on a processor.

17. The digital receiver apparatus according to claim 15 further comprising:
a remote control;
an input for receiving commands from the remote control;
wherein the button is located on the remote control.

18. A digital receiver apparatus comprising:
receiving circuitry capable of tuning to a selected radio frequency and recovering a digital bit stream from the selected radio frequency;
a demultiplexer capable of selecting a single subchannel from a plurality of subchannels in the digital bit stream;
a 1st button and a 2nd button;
a preset memory used for storing for a preset radio frequency identifier and a subchannel identifier associated with each of the 1st button and the 2nd button;
a last button pressed memory containing information on which of the 1st button or the 2nd button was most recently pressed;
control circuitry capable of detecting when a button press of either the 1st button or the 2nd button has occurred;
the control circuitry commanding the demultiplexer to select a different single subchannel from the plurality of programs in the digital bit stream using a circular queue ordering if the button press is the same as the information stored in the last button pressed memory; and
the control circuitry commanding the receiving circuitry to tune to a different radio frequency indicated by the preset radio frequency identifier and the subchannel identifier associated with the button press if the button press is different than the information stored in the last button pressed memory.

19. The digital receiver apparatus according to claim 18, wherein at least one of the receiving circuitry, the demultiplexer and the control circuitry is implemented using firmware running on a processor.

20. The digital receiver apparatus according to claim 18 further comprising:
a remote control;
an input for receiving commands from the remote control;
wherein the 1st button and the 2nd button are located on the remote control.

* * * * *